(12) United States Patent
Sethre et al.

(10) Patent No.: US 11,599,808 B2
(45) Date of Patent: Mar. 7, 2023

(54) ARTIFICIAL INTELLIGENCE ASSISTED HYBRID ENTERPRISE/CANDIDATE EMPLOYMENT ASSISTANCE PLATFORM

(71) Applicant: Intry, LLC, Dripping Springs, TX (US)

(72) Inventors: Jennifer Sethre, Austin, TX (US); Aquiles Mata, Austin, TX (US); Aaron Salley, New York, NY (US)

(73) Assignee: Intry, LLC, Dripping Springs, TX (US)

( * ) Notice: Subject to any disclaimer, the term of this patent is extended or adjusted under 35 U.S.C. 154(b) by 257 days.

(21) Appl. No.: 16/931,922

(22) Filed: Jul. 17, 2020

(65) Prior Publication Data
US 2020/0394539 A1    Dec. 17, 2020

Related U.S. Application Data

(63) Continuation of application No. 16/902,152, filed on Jun. 15, 2020.

(60) Provisional application No. 62/861,232, filed on Jun. 13, 2019.

(51) Int. Cl.
*G06N 5/04*  (2006.01)
*G06Q 10/1053*  (2023.01)
*G06N 3/008*  (2023.01)
*G06N 20/00*  (2019.01)
*G06N 5/02*  (2023.01)

(52) U.S. Cl.
CPC ............ *G06N 5/04* (2013.01); *G06N 3/008* (2013.01); *G06N 5/02* (2013.01); *G06N 20/00* (2019.01); *G06Q 10/1053* (2013.01)

(58) Field of Classification Search
CPC .......... G06N 5/04; G06N 20/00; G06N 3/008; G06N 5/02; G06Q 10/1053
See application file for complete search history.

(56) References Cited

U.S. PATENT DOCUMENTS

| | | | |
|---|---|---|---|
| 2013/0046704 A1* | 2/2013 | Patwa | G06Q 10/06 705/321 |
| 2015/0006286 A1* | 1/2015 | Liu | G06Q 50/01 705/14.53 |
| 2015/0127565 A1* | 5/2015 | Chevalier | H04W 4/21 705/319 |
| 2018/0308062 A1* | 10/2018 | Quitmeyer | G06Q 10/1053 |
| 2019/0012307 A1* | 1/2019 | Ling | G06Q 50/01 |
| 2019/0114593 A1* | 4/2019 | Champaneria | G06F 16/3326 |

* cited by examiner

*Primary Examiner* — Beau D Spratt
(74) *Attorney, Agent, or Firm* — Dickinson Wright PLLC; Stephen A. Mason; Jonathan H. Harder

(57) ABSTRACT

A platform for providing employment assistance services to enterprises and candidates is disclosed. For example, the platform trains, based on personal attributes of employees of multiple enterprise and work culture attributes associated with each employer of the multiple enterprises, a machine learning model that defines associations between the personal attributes and the work culture attributes. Further, the platform extracts information associated with a person from one or more sources on the Web where the person is represented, generates, based on the information associated with the person, a user profile associating personal attributes with the person, applies the user profile to the machine learning model; and receives an indication, from the machine learning model, of an employer profile that is compatible with the user profile, the employer profile including work culture attributes associated with an employer.

20 Claims, 12 Drawing Sheets

Your personality is: Gamesman

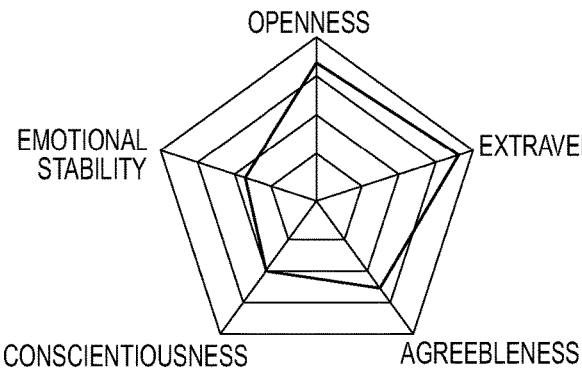

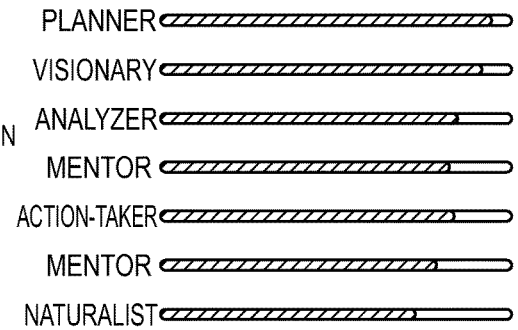

YOU ARE ALL ABOUT THE DETAILS. YOU ENJOY BEING AROUND OTHER PEOPLE, AND YOU EXCEL WHEN YOU HAVE THE OPPORTUNITY TO EMERGE IN A LEADERSHIP ROLE. YOU BRING PEOPLE TOGETHER, AND OTHERS RELY ON YOU TO HAVE THE DETAILS OF A PLAN ORGANIZED AND READY TO GO. YOU MAKE THINGS HAPPEN. YOU ARE HAPPIEST WHEN AROUND OTHER PEOPLE, AND AS LONG AS YOU ARE ABLE TO FOLLOW YOUR ROUTINE, YOU DON'T NEED A LOT OF ALONE TIME.

[PREFERS WORKING WITH OTHERS] [COMPULSIVE] [PRACTICAL]
[RATIONAL] [CONVENTIONAL] [LEADER] [DECISIVE] [PARTICULAR]
[PROCESS-ORIENTED] [HIGH-ENERGY] [OUTGOING] [CONFIDENT]
[DETAIL-ORIENTED] [CONCRETE] [LIKES FAMILIARITY]
[DELIBERATE] [DIRECT] [SERIOUS] [REALISTIC] [METICULOUS]

COMPLIMENTS
YOU ARE SENSITIVE, GREGARIOUS AND COMPATIBLE WITH MANY WORKERS. YOU EXCEL AT MULTITASKING AND DOING TASKS ON THE FLY IN A RELAXED, SPONTANEOUS WAY, AND YOU OFTEN WORK IN A NONLINEAR FASHION, ACCOMPLISHING A LITTLE OF THIS AND A LITTLE OF THAT. YOU ENJOY BEING THE CENTER OF ATTENTION, LEADING OTHERS, AND OFTEN RADIATE HIGH ENERGY, THINKING OUTSIDE THE BOX AND NEVER RESTING ON YOUR LAURELS. ALTHOUGH YOU ENJOY WORKING WITH OTHERS, OTHERS MAY VIEW YOU AS A DREAMER WHO HAS A HARD TIME FOCUSING AND GETTING THINGS DONE.

CONFLICTS
BECAUSE YOU THINK BY EXPRESSING YOUR THOUGHTS OUT LOUD, YOU MAY BE PERCEIVED BY OTHERS AS DOMINATING THE CONVERSATION AND BEING A POOR LISTENER. THEREFORE, YOU MAY HAVE TO REIN YOURSELF IN, AT TIMES, TO ALLOW OTHERS TO CONTRIBUTE, TOO. ALSO, BECAUSE OF YOU CAN BE EMOTIONALLY ERRATIC AND FLEXIBLE, YOU MAY BE VIEWED AS TOO LAID BACK, AT TIMES, AND ENGAGING IN THE PROCESS OF DOING BY SOME, WHO FEEL THAT YOU GET LOST IN THE WEEDS AND ARE NOT TASK ORIENTED OR FOCUSED ENOUGH.

BEST WORK ENVIRONMENTS
> IS LESS STRUCTURED
> ALLOWS FOR WORKING WITH OTHERS
> ALLOWS FOR THE INITIATION OF NEW GROUP ACTIVITIES BY MEMBERS
> VALUES CREATIVITY
> FEATURES A LOW KEY ATMOSPHERE THAT DOESN'T SEEM OVERLY COMPETITIVE
> ENCOURAGES SELF-EXPRESSION

FIG. 5

File Edit Format View Help

Jennifer Sethre
-MISSING DATA HERE-
Contact
jennifer.sethra@gmail.com
512-333-333
Austin, TX
Summary
Attended the University of Texas and attained a Bachelor's Degree in Computer Science; Proficiency in several modern programming languages such as Java, C++, C#; More than Minimum 10 years professional experience in software development.
Skills
Data Modeling
Database Design
Data Mining
Data Management
Experience
Software Company 1
May 2016 - Present
Designing, building, and deploying software to support customer channels * Helping define engineering best practices and providing technical mentorship to other members of the engineering team
Software Company 2
May 2012 - May-2016
Designed and built software for virtual assistant enabled devices, remote clients and server systems * Solved difficult problems with elegant and practical code

FIG. 13B

ARTIFICIAL INTELLIGENCE ASSISTED HYBRID ENTERPRISE/CANDIDATE EMPLOYMENT ASSISTANCE PLATFORM

CROSS-REFERENCE TO RELATED APPLICATIONS

This application is a continuation of U.S. patent application Ser. No. 16/902,152, filed on Jun. 15, 2020, entitled "Artificial Intelligence Assisted Hybrid Enterprise/Candidate Employment Assistance Platform," which claims priority to and the benefit of U.S. Provisional Application Patent Ser. No. 62/861,232, filed Jun. 13, 2019, entitled "Artificial Intelligence Assisted Hybrid Resume Generation System," the entire disclosure of these patent applications are hereby incorporated herein by reference in is their entirety for all purposes.

BACKGROUND

Historically, resumes and curriculum vitae (CVs), henceforth referred to as documents, were created manually on machines, with software, or, more recently, using online tools. While the evolution of technology has aided in making the process less labor-intensive for the end user, it has not made the process more intelligent. Further, even the best crafted documents have not enhanced the success rate of a candidate getting through ubiquitous applicant tracking systems (ATS) that attempt to read and parse the information contained within the document. This has produced a sentiment that the workforce is under qualified for the jobs available.

The perceived solution in the industry to the problems inherent in ATS failures resulting from the submission of documents produced by the current means of creation has been to alter, refine, and manipulate job order requirement definitions. This solution, however, does not increase the success of identifying candidates based on inherent skills possessed, and may actually increase failures by being too restrictive. Additionally, the average end user is unaware of underlying technical processes that allow an ATS to function in the first place. Since job order manipulation did not address all points of failure in the candidate identification process, this method has not reduced the claim that applicants are not skilled for the jobs solicited.

SUMMARY

Representative embodiments set forth herein disclose various techniques for enabling a system and method for operating a clinic viewer on a computing device of a medical personnel.

In one embodiment, a method, comprises: training, based on personal attributes of employees of multiple employers and work culture attributes associated with each employer of the multiple employers, an employee-employer compatibility model that defines associations between the personal attributes and the work culture attributes; extracting information associated with a person from one or more sources on the Web where the person is represented; generating, based on the information associated with the person, a user profile associating personal attributes with the person; applying the user profile to the employee-employer compatibility model; receiving an indication, from the employee-employer compatibility model, of an employer profile that is compatible with the user profile, the employer profile including work culture attributes associated with an employer; and generating a notification that indicates at least one of a designation of the employer or the work culture attributes associated with the employer.

In another embodiment, a system, comprises: a model generator configured to train, based on personal attributes of employees of multiple employers and work culture attributes associated with each employer of the multiple employers, an employee-employer compatibility model that defines associations between the personal attributes and the work culture attributes; an agent of the system configured to extract information associated with an employer from one or more sources on the Web where the employer is represented; and cognitive artificial intelligence engine configured to: generate, based on the information associated with the employer, an employer profile including work culture attributes of the employer; apply the employer profile to the employee-employer compatibility model; and receive an indication, from the employee-employer compatibility model, of a user profile that is compatible with the employer profile, the user profile associating personal attributes with a person.

Still yet, in another embodiment, a computer-readable storage medium having program instructions recorded thereon that, when executed by at least one processing circuit of a computing device, perform a method, comprises: training, based on personal attributes of employees of multiple employers and work culture attributes associated with each employer of the multiple employers, an employee-employer compatibility model that defines associations between the personal attributes and the work culture attributes; extracting information associated with a person from one or more sources on the Web where the person is represented; generating, based on the information associated with the person, a user profile associating personal attributes with the person; applying the user profile to the employee-employer compatibility model; receiving an indication, from the employee-employer compatibility model, of an employer profile that is compatible with the user profile, the employer profile including work culture attributes associated with an employer; and generating a notification that indicates at least one of a designation of the employer or the work culture attributes associated with the employer.

BRIEF DESCRIPTION OF THE DRAWINGS

For a detailed description of example embodiments, reference will now be made to the accompanying drawings in which:

FIG. 5 provides an example of a candidate profile generated in accordance with various embodiments.

FIGS. 13A and 13B provide an exemplary embodiment of a hybrid resume generated, in accordance with various embodiments.

NOTATION AND NOMENCLATURE

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
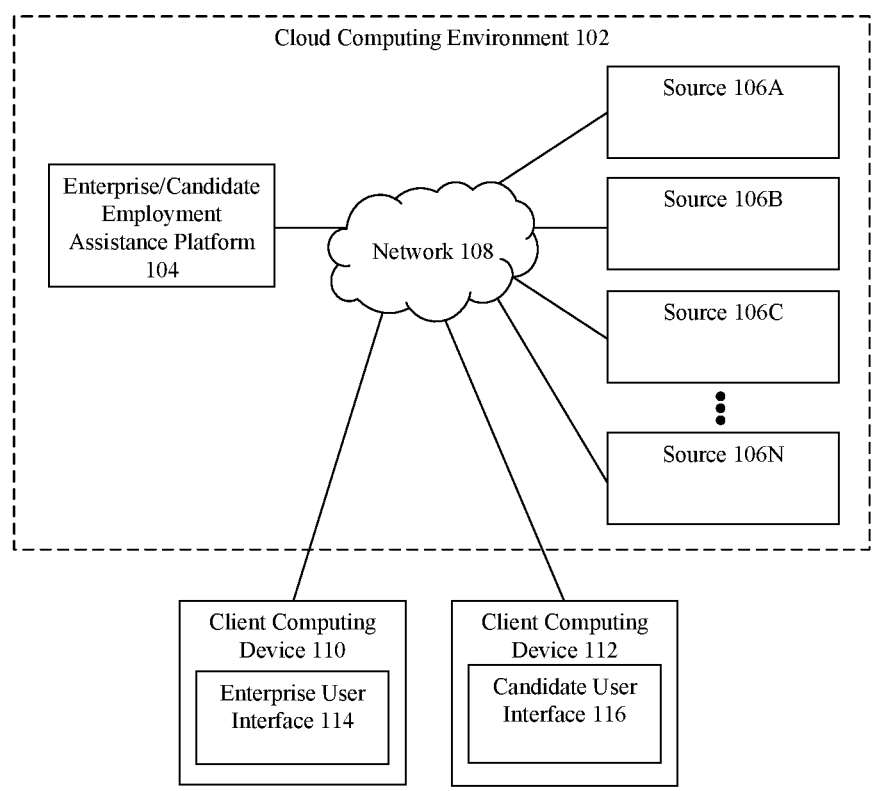
FIG. 1 shows a block diagram of an example of a cloud computing environment 102, in accordance with various embodiments.

Embodiments described herein bestow improvements to traditional tools used by enterprises for recruiting and candidates for job seeking. To help illustrate, FIG. 1 will now be described. FIG. 1 depicts a block diagram of an example system 100 for providing employment assistance services to enterprises and candidates, according to an embodiment. Enterprises as described herein refers to an organization or a business seeking or having employees. Candidate as described herein refers to a person who aspires to or is qualified for employment by an enterprise.

In FIG. 1, system 100 comprises a cloud computing environment 102 and a plurality of computing devices, such as a client computing device 110 and a client computing device 112. As shown in FIG. 1, a cloud computing environment 102 includes an enterprise/candidate employment assistance platform 104 and sources 106A, 106B, 106C . . . 106N. In an embodiment, enterprise/candidate employment assistance platform 104 may be a cloud service/application running in one or more resources in cloud computing environment 102. Sources 106A, 106B, 106C . . . 106N may include websites hosted on or cloud services/applications running in one or more resources in cloud computing environment 102. For example, the one or more resources may be one or more servers and form a network-accessible server set that are each accessible by a network such as the Internet (e.g., in a "cloud-based" embodiment) to store, manage, and process data. Additionally, cloud computing environment 102 may include any type and number of other resources including resources that facilitate communications with and between the servers (e.g., network switches, networks, etc.), storage by the servers (e.g., storage devices, etc.), resources that manage other resources (e.g., hypervisors that manage virtual machines to present a virtual operating platform for tenants of a multi-tenant cloud, etc.), and/or further types of resources. As such, enterprise/candidate employment assistance platform 104 may be implemented in various ways.

As portrayed in FIG. 1, enterprise/candidate employment assistance platform 104 is communicatively coupled via a network 108 to sources 106A, 106B, 106C . . . 106N. Network 108 may comprise one or more networks such as local area networks (LANs), wide area networks (WANs), enterprise networks, the Internet, etc., and may include one or more of wired and/or wireless portions.

More specifically, enterprise/candidate employment assistance platform 104 is configured to access information associated with a candidate, an enterprise, employees of the enterprise, and/or current employment related data maintained by sources 106A, 106B, 106C . . . 106N. As an example, enterprise/candidate employment assistance platform 104 may access information associated with a candidate or enterprise via an application programming interface (API) social networking services, such as Facebook®, Twitter®, Instagram®, LinkedIn®, Scrubber®, etc. Enterprise/candidate employment assistance platform 104 may also access employment related data maintained by different entities, such as unemployment agencies (e.g., U.S. Department of Labor, Texas Workforce Commission, etc.), temp agencies, trade schools and universities (e.g., U.S. Department of Education, State Boards, etc.) military entities (e.g., U.S. Department of Defense, United Services Automobile Association®, etc.), entities associated with the elderly (American Association of Retired Persons®), etc.

As further shown in FIG. 1, enterprise/candidate employment assistance platform 104 is communicatively coupled via the network 108 to computing device 110 and computing device 112. Computing device 110 and computing device 112 may include at least one network interface that enables communications over network 106. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Client computing devices 110 and 112 may be any type of stationary or mobile computing device, including a mobile computer or mobile computing device (e.g., a smart phone, a laptop computer, a notebook computer, a tablet computer such as an Apple iPad™, a netbook, etc.), a wearable computing device (e.g., a smart watch, a head-mounted device including smart glasses such as Google® Glass™, etc.), or a stationary computing device such as a desktop computer or PC (personal computer).

Enterprise/candidate employment assistance platform 104 is configured to provide employment assistance services to enterprises and candidates. For example, a user (such as a candidate or job seeker) of client computing device 112 may access employment assistance services provided by enterprise/candidate employment assistance platform 104 through a candidate-specific user interface, a user interface 116, executing on client computing device 112. As another example, a user (such as an HR representative of an enterprise) of client computing device 110 may access employment assistance services provided by enterprise/candidate employment assistance platform 104 through an enterprise-specific user interface, a user interface 114, executing on client computing device 110. For example, user interface 114 and user interface 116 may be represented as a web page displayed in a web browser executing on client computing device 110 and client computing device 112, respectively. As another example, user interface 114 and user interface 116 may be an Internet-enabled application executing on client computing device 110 and client computing device 112, respectively. Still other implementations of user interface 108 and provider interface 120 are possible.

Figure 2:
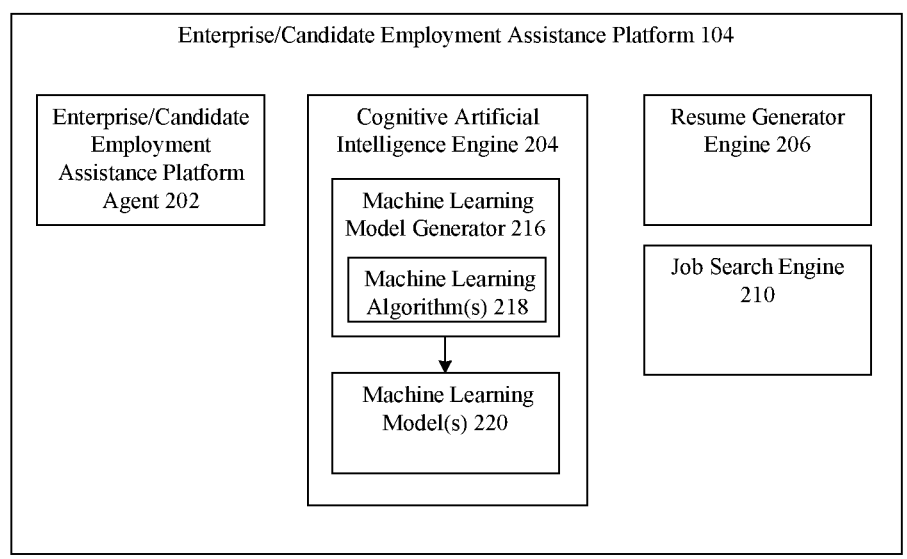
FIG. 2 shows a block diagram of an example of an enterprise/Candidate Employment Assistance Platform, in accordance with various embodiments.

To explore in further detail the employment assistance services provided by enterprise/candidate employment assistance platform 104, FIG. 2 will now be described. Note that enterprise/candidate employment assistance platform 104 of FIG. 1 may be implemented in various ways to perform its functions. For instance, FIG. 2 is a block diagram for a system 200 that provides employment assistance services to enterprises and candidates, in accordance with an example embodiment. As shown in FIG. 2, system 200 includes enterprise/candidate employment assistance platform 104. As further shown in FIG. 2, enterprise/candidate employment assistance platform 104 includes enterprise/candidate employment assistance platform agent 202 (hereinafter referred to as "agent 202"), a cognitive artificial intelligence (AI) engine 204, a resume generator engine 206, and a job search engine 210. In various embodiments, the several computing devices executing within enterprise/candidate employment assistance platform 104 are communicably coupled by way of a network/bus interface. Furthermore, the several components of enterprise/candidate employment assistance platform 104 may be communicably coupled by one or more inter-host communication protocols. In some embodiments, the several components of enterprise/candidate employment assistance platform 104 may execute on separate computing devices. Still yet, in some embodiments, the several components of enterprise/candidate employment assistance platform 104 may be implemented on the same computing device or partially on the same computing device, without departing from the scope of this disclosure. System 200 is described in further detail as follows.

The several computing devices work in conjunction to implement the several components of enterprise/candidate employment assistance platform 104. Enterprise/candidate employment assistance platform 104 is not limited to implementing only these components, or in the manner described in FIG. 1 and FIG. 2. That is, enterprise/candidate employment assistance platform 104 can be implemented, with different or additional components, without departing from the scope of this disclosure. The example enterprise/candidate employment assistance platform 104 illustrates one way to implement the methods and techniques described herein.

As further shown in FIG. 2, cognitive AI engine 204 includes a machine learning (ML) model generator 216 and ML models 220. ML model generator 216 is configured to generate ML models 220 to facilitate the employment assistance services provided by enterprise/candidate employment assistance platform 104. As shown in FIG. 2, the ML models 220 are deployed in cognitive AI engine 204.

In an embodiment, ML model generator 216 is configured to generate an employee-employer compatibility model used to match qualified candidates with enterprises, where the candidates are compatible with the company culture of the enterprise. For example, as depicted in FIG. 2, model generator 204 includes a machine learning algorithm 218. Machine learning algorithm 218 is provided personal attributes of employees of multiple employers and work culture attributes associated with each employer of the multiple employers as input, and is executed by model generator 216 to generate the employee-employer compatibility model. Personal attributes of employees may include characteristics or personality traits of an individual. Some examples of personal attributes include: loyalty, commitment, honesty, enthusiasm, reliability, positive self-esteem, sense of humor, motivation, adaptability, etc. Work culture attributes are directed to the character and personality of the enterprise. Some examples of work culture attributes include: fairness, environment of collaboration, encouragement of employee engagement, learning opportunities, good communication, opportunities for growth, etc.

For example, ML model generator 216 may provide personal attributes of employees and work culture attributes of enterprises to a ML algorithm of ML algorithms 218. ML model generator 216 may also include a machine learning (ML) application that implements the ML algorithm to the employee-employer compatibility model. When the ML algorithm is implemented, it may find patterns personal attributes of employees and work culture attributes of enterprises to map the personal attributes to the work culture attributes, and output a model that matches qualified candidates with enterprises, where the candidates are compatible with the company culture of the enterprise. In some embodiments, the ML algorithm may find patterns personal attributes of employees and work culture attributes of enterprises to map the personal attributes to the work culture attributes, and output a model that matches an enterprise having certain attributes (e.g., company culture) to a candidate employees having matching personal attributes (e.g., desired culture), where the enterprise is compatible with the personal attributes of the employee. The employee-employer compatibility model may be generated using any suitable techniques, including supervised machine learning model generation algorithms such as supervised vector machines (SVM), linear regression, logistic regression, naïve Bayes, linear discriminant analysis, decision trees, k-nearest neighbor algorithm, neural networks, recurrent neural network, etc. In some embodiments, unsupervised learning algorithms may be used such as clustering or neural networks.

Note that the employee-employer compatibility model may be generated in various forms. In accordance with one embodiment, the employee-employer compatibility model may be generated according to a suitable machine-learning algorithm mentioned elsewhere herein or otherwise known. In an embodiment, ML model generator 216 may implement a gradient boosted tree algorithm or other decision tree algorithm to generate and/or train the employee-employer compatibility model in the form of a decision tree. The decision tree may be traversed with input data (personal attributes of a candidate, etc.) to identify one or more enterprises that the candidate is compatible with. Alternatively, ML model generator 216 may implement an artificial neural network learning algorithm to generate the employee-employer compatibility model as a neural network that is an interconnected group of artificial neurons. The neural network may be presented with personal attributes of the candidate to identify attributes of a work culture that the candidate is compatible with.

Cognitive AI engine 204 is further configured to receive data via agent 202 from sources 106A, 106B, 106C ... 106N in FIG. 1. For example, as described with reference to FIG. 1, agent 202 may retrieve information associated with a candidate, an enterprise, and employees of the enterprise from various sources on the Web and provide the information to cognitive AI engine 204. More specifically, agent 202 may extract information associated with a candidate, an enterprise, or an employee from sources (e.g., social networking services, personal websites, business/marketing websites, professional associations websites, informational or reference websites, etc.) on the Web where candidates, enterprises, or the employees are represented (e.g., via Web scraping software, APIs exposed by social networking services, etc.). In some embodiments, a user may use a computing device to interact with the agent 202 and upload the information associated with a candidate, an enterprise, and employees of the enterprise. In such a way, the user using the computing device may itself be a source.

Further, cognitive AI engine 204 may use natural language processing (NLP), data mining, and pattern recognition technologies to process analyze the retrieved information and generate a profile associated with an employee or candidate that associates personal attributes with the employee or candidate or generate a profile that associates work culture attributes with an enterprise. More specifically, cognitive AI engine 204 may use different AI technologies to understanding language, translate content between languages, recognize elements in images and speech, and perform sentiment analysis. For example, cognitive AI engine 204 may rely on NLP technologies for the recognition and translation of spoken language in content and for understanding of natural language in written content. As another example, cognitive AI engine 204 may use imaging extraction techniques, such as optical character recognition (OCR) and/or use a machine learning model trained to identify and extract information from images. OCR refers to electronic conversion of an image of printed text into machine-encoded text. As another example, pattern recognition and/or computer vision may also be used to process images. Computer vision may involve image understanding by processing symbolic information from image data using models constructed with the aid of geometry, physics, statistics, and/or learning theory. Pattern recognition may refer to electronic discovery of regularities in data through the use of computer algorithms and with the use of these regularities to take actions such as classifying the data into different categories and/or determining what the symbols represent in the image (e.g., words, sentences, names, numbers, identifiers, etc.). Cognitive AI engine 204 may also use NLU techniques to process unstructured data using text analytics to extract entities, relationships, keywords, semantic roles, and so forth. Furthermore, cognitive AI engine 204 may use sentiment analysis to identify, extract, and quantify subjective information from social media sources associated with a candidate, an employee, or an enterprise. Cognitive AI engine 204 may use the same technologies to synthesize data from various information sources, while weighing context and conflicting evidence, in generating a profile.

Figure 4A:
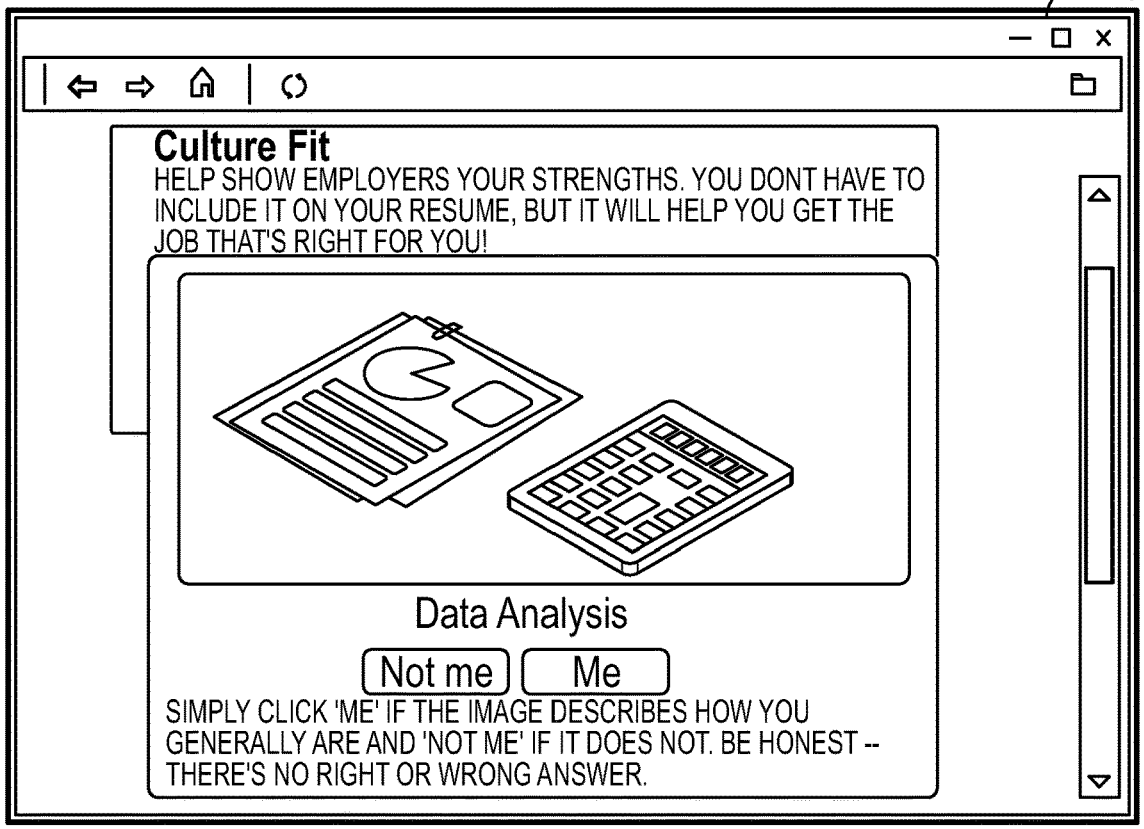
FIGS. 4A and 4B provide an example of questions that may be provided to a candidate through user interface in assessing a cultural fit of a candidate with an enterprise, in accordance with various embodiments.
Figure 4B:
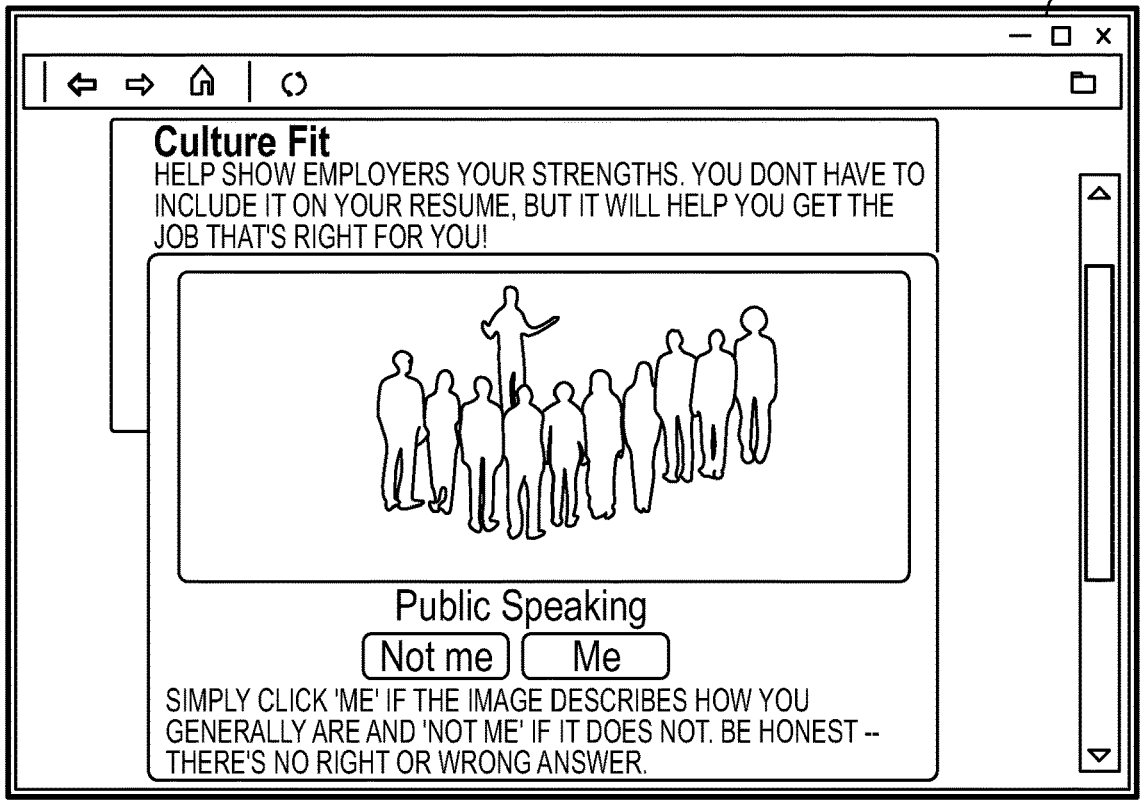

Additionally, in FIG. 2, agent 202 may be further configured to interact with client computing device 110 and client computing device 112 in FIG. 1 via user interface 114 and user interface 116, respectively. For example, via agent 202, may provide a candidate, via user interface 116, with a series of questions generated to assess characteristics and preferences of a candidate. In some embodiments, the responses provided may also be used in generating a profile for a candidate. In some embodiments, information associated with the candidate provided to platform 104 by the candidate (e.g., in a resume) may also be used in generating a profile for the candidate. To help further illustrate, FIGS. 4A and 4B provide an example of questions that may be provided to a candidate through user interface 116. As shown in FIGS. 4A and 4B, a candidate may be prompted to respond to a series of questions by indicating if an item (such as "Data Analysis", "Public Speaking", etc.) is 'Me' or 'Not me'. Further, FIG. 5 provides an example of a candidate profile generated by Cognitive AI engine 204. For example, in FIG. 5, the candidate profile conveys a list of attributes associated with the candidate (e.g., rational, practical, confident, prefers working with others, etc.), a personality type, strengths and weaknesses, and examples of ideal work environments for the candidate. In some embodiments, based on the responses provided and information retrieved from other sources on the Web where the candidate is represented, cognitive AI engine 204, using different AI technologies (e.g., the employee-employer compatibility model) determine how attributes associated with the candidate may serve as a strength or a weakness in a professional setting (e.g., "Complements" and "Conflicts" sections in FIG. 5) and recommend company culture characteristics that may be most compatible with the candidate ("Best work environments" section in FIG. 5).

In some embodiments, cognitive AI engine 204 may extract additional information associated with an enterprise from one or more job listings published by the enterprise and generate an enterprise profile based on the additional information associated with the employer.

Moreover, cognitive AI engine 204 is configured to apply the candidate profile to the employee-employer compatibility model. More specifically, cognitive AI engine 204 provides the candidate profile to employee-employer compatibility model and cognitive AI engine 204 receives, from the employee-employer compatibility model, an indication that one or more employer profiles are compatible with the candidate profile. In some embodiments, the indication generated by the employee-employer compatibility model may specify a designation of the employer or the work culture attributes associated with the employer. Agent 202 is configured to provide the notification to client computing device 112.

Cognitive AI engine 204 is configured to update the machine learning models 220, such as the employee-employer compatibility model to account for one or more associations detected between a candidate profile and an enterprise profile. For example, cognitive AI engine 204 may maintain the employee-employer compatibility model by continuously retraining the employee-employer compatibility model based personal attributes of candidates and personal attributes of employees of enterprises. In some embodiments, cognitive AI engine 204 is configured to train the employee-employer compatibility model based on professional attributes of the person. Professional attributes may include work-related knowledge, skills, and abilities, education, and experience of a candidate.

Agent 202 is further configured to identify job listings of enterprises having work culture compatible with a candidate via job search engine 210 and generate a notification for the person including indications of the job listings.

In some embodiments, cognitive AI engine 204 is further configured to receive via agent 202 extracted information associated with an enterprise from one or more sources on the Web where the enterprise is represented and generate, based on the information associated with the enterprise, an enterprise profile including work culture attributes of the enterprise. Further, cognitive AI engine 204 may apply the employer profile to the employee-employer compatibility model and receive an indication, from the employee-employer compatibility model, of one or more candidate profiles that are culturally compatible with the enterprise profile. In some embodiments, cognitive AI engine 204 may receive a notification from employee-employer compatibility model that indicates at least one of information identifying the person or the personal attributes.

Figure 3:
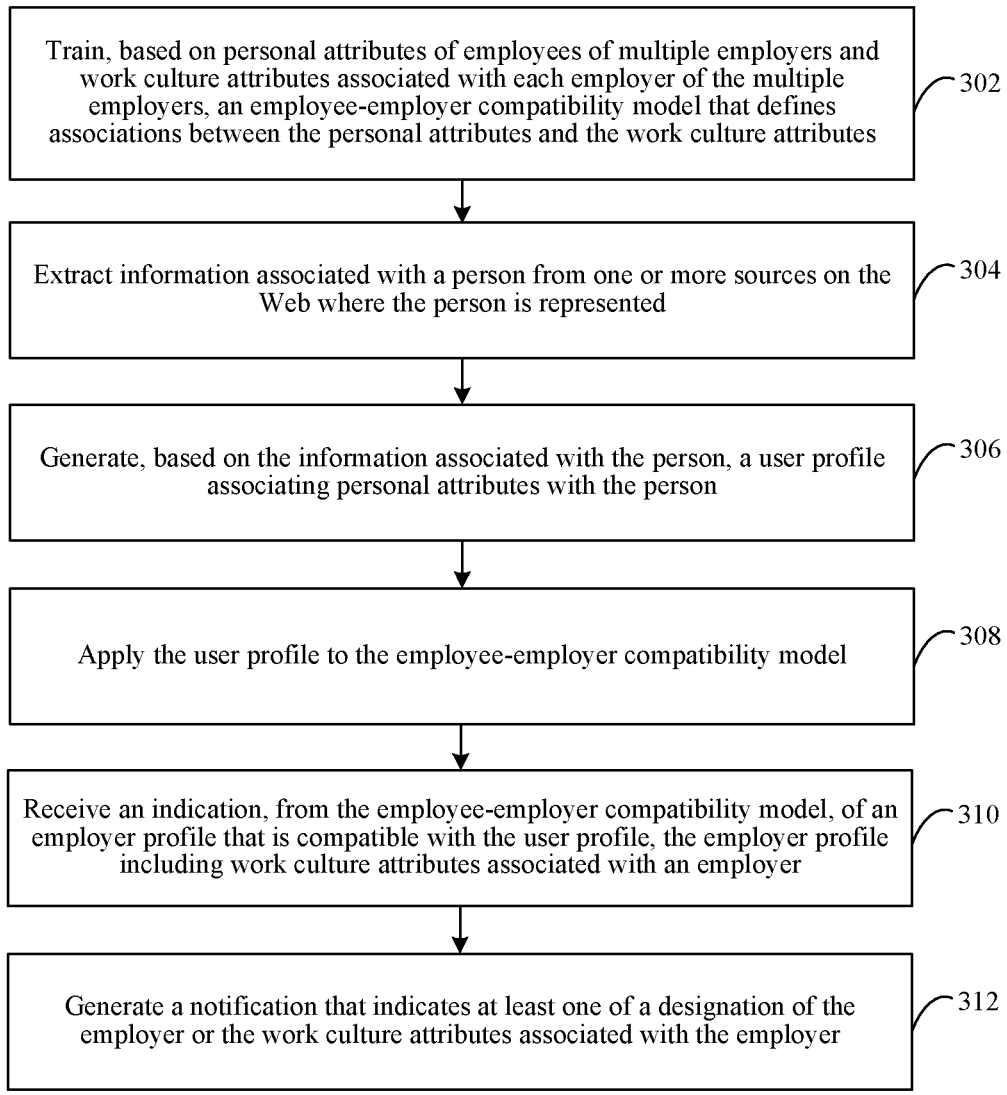
FIG. 3 shows a method for generating a machine learning model and applying an input to the machine learning model, in accordance with various embodiments.

To explore this further, FIG. 3 will now be described. FIG. 3 shows a method 300 for generating a machine learning model that defines associations between the personal attributes of employees and the work culture attributes of enterprises and applying a candidate profile to the machine learning model. As shown in FIG. 3, method 300 begins at step 302. At step 302, based on personal attributes of employees of multiple employers and work culture attributes associated with each employer of the multiple employers, an employee-employer compatibility model is trained. The employee-employer compatibility model defines associations between the personal attributes and the work culture attributes. For example, as described with reference to FIG. 1 and FIG. 2, cognitive AI engine 204 may train employee-employer compatibility model on attributes associated with candidates, attributes associated with employees of enterprises, and attributes of company culture associated with enterprises.

At step 304, information associated with a person is extracted from one or more sources on the Web where the person is represented. For example, and with continued reference to FIG. 1 and FIG. 2, agent 202 may retrieve information associated with a candidate, an enterprise, and employees of the enterprise from various sources on the Web and provide the information to cognitive AI engine 204.

At step 306, based on the information associated with the person, a user profile is generated, the user profile associating personal attributes with the person. For example, and with continued reference to FIG. 1 and FIG. 2, cognitive AI engine 204 may generate a profile for a candidate based on the information associated with the candidate that is extracted from one or more sources on the Web where the candidate is represented.

At step 308, the user profile is applied to the employee-employer compatibility model. For example, and with continued reference to FIG. 1 and FIG. 2, cognitive AI engine 204 may apply a candidate profile to the employee-employer compatibility model.

At step 310, an indication is received, from the employee-employer compatibility model, where the indication is of an employer profile that is compatible with the user profile and where the employer profile including work culture attributes associated with an employer. For example, and with continued reference to FIG. 1 and FIG. 2, cognitive AI engine 204 may receive from the employee-employer compatibility model an indication that an enterprise is compatible with the candidate profile.

At step 312, a notification is generated, the notification indicates at least one of a designation of the employer or the work culture attributes associated with the employer. For example, and with continued reference to FIG. 1 and FIG. 2, agent 202 generates a notification indicating a designation of the enterprise or the work culture attributes associated with the enterprise that the candidate is compatible with.

There are several technical benefits for matching candidates with an enterprise, where the candidate is compatible with the company culture of the enterprise. One such benefit of providing a list of job descriptions from enterprises that candidates culturally match is that it increases the probability the candidate will find a match that interests them without having to scroll through pages of results. Each scroll is a request to the network and by reducing the chance that the user will make that call for additional matches, computing resources are saved (e.g., processing, network, memory). Also, the user interface includes the most relevant culture matches, thereby providing an improved user interface that may increase the user's experience using the computing device and platform by not having to perform a lot of individual searches. In addition, computing resources are further saved by employing AI technologies to process large amounts of data to provide better matches for candidates and employers.

Figure 6:
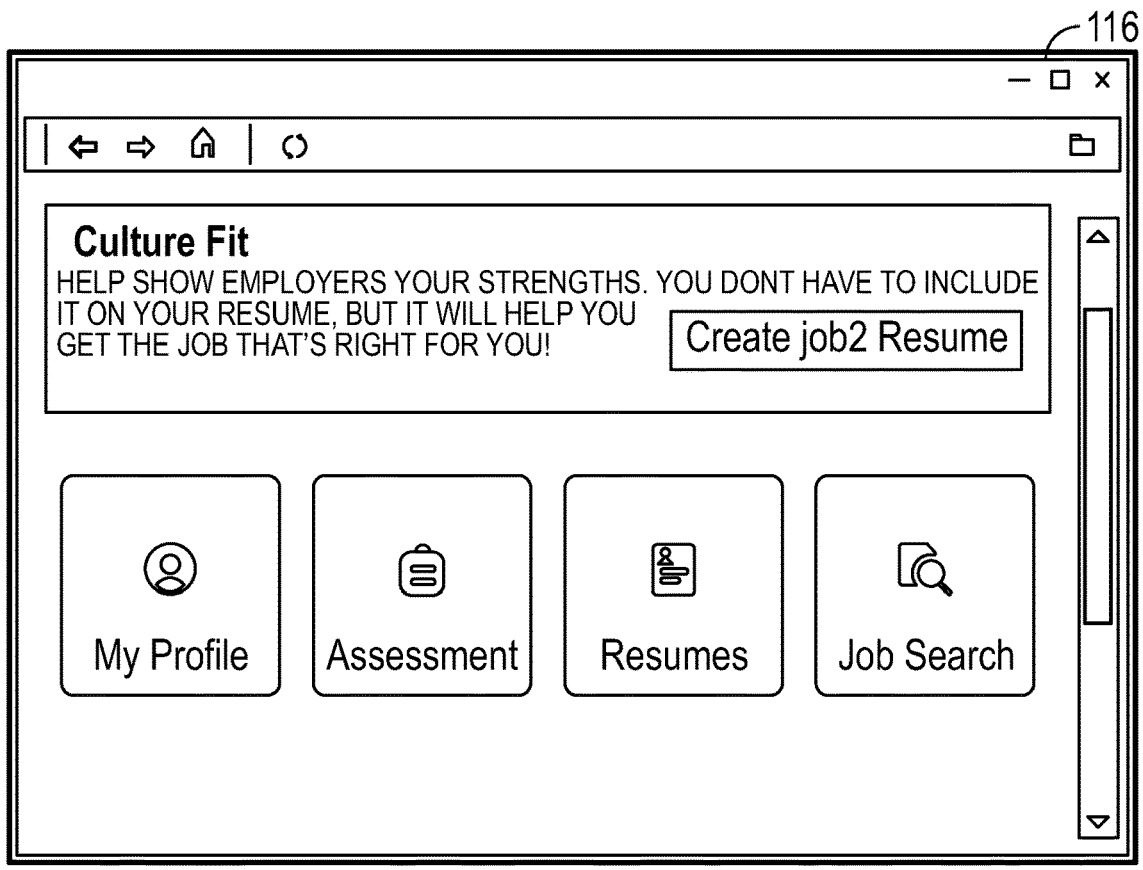
FIG. 6 provides an exemplary embodiment of a user interface used to access services provided by enterprise/candidate employment assistance platform, in accordance with various embodiments.

FIG. 6 provides an exemplary embodiment of user interface 116 in FIG. 1. FIG. 6 shows how a candidate may interact with enterprise/candidate employment assistance platform 104 to access its one or more employment assistance services. For example, in FIG. 2, a user may initiate generation of a resume by selecting the "Create Job2Resume™" button. In particular, resume generator engine 206 is configured to interact with cognitive AI engine 204 to use cognitive AI to generate a resume for a candidate.

Figure 7:
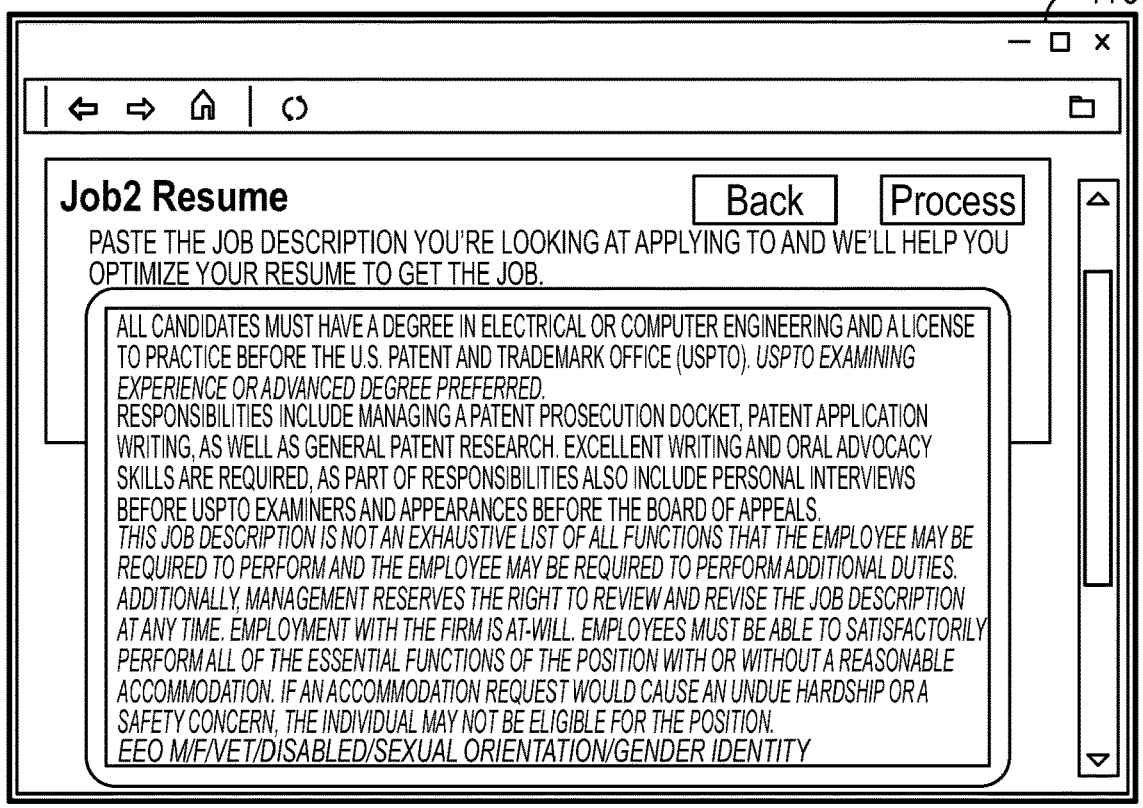
FIG. 7 provides an exemplary embodiment of a user interface prompting a user to provide a job description or listing that the user is looking to apply to, in accordance with various embodiments.

To help further illustrate, in FIG. 7, after selecting Create Job2Resume™ button, the user is prompted through user interface 116 to paste a job description or listing that the user is looking to apply to. Using the job description or listing, resume generator engine 206 is enabled to optimize a resume for applying to the position associated with the job description or listing. The user may then select the "Process" button to initiate generation of the resume.

Subsequently, resume generator engine 206 may provide a previously uploaded resume of the user and the job description or listing to cognitive AI engine 204. Using the technologies previously described herein, cognitive AI engine 204 analyzes the job description or listing and compares the job description or listing with the resume of the user. After the comparison, cognitive AI engine 204 may find information included in the job description or listing that should be included in the resume. For example, cognitive AI engine 204 may parse the resume and find that the user failed to include in the resume a required skill listed in the job description or listing. Moreover, cognitive AI engine 204 may identify one or more items that should be included in the resume that are not explicitly stated in the job description or listing. For example, cognitive AI engine 204 may determine, based on analysis of resumes of other candidates, that a required skill listed in the job description is most often included with another skill in the resumes of other candidates.

Figure 8:
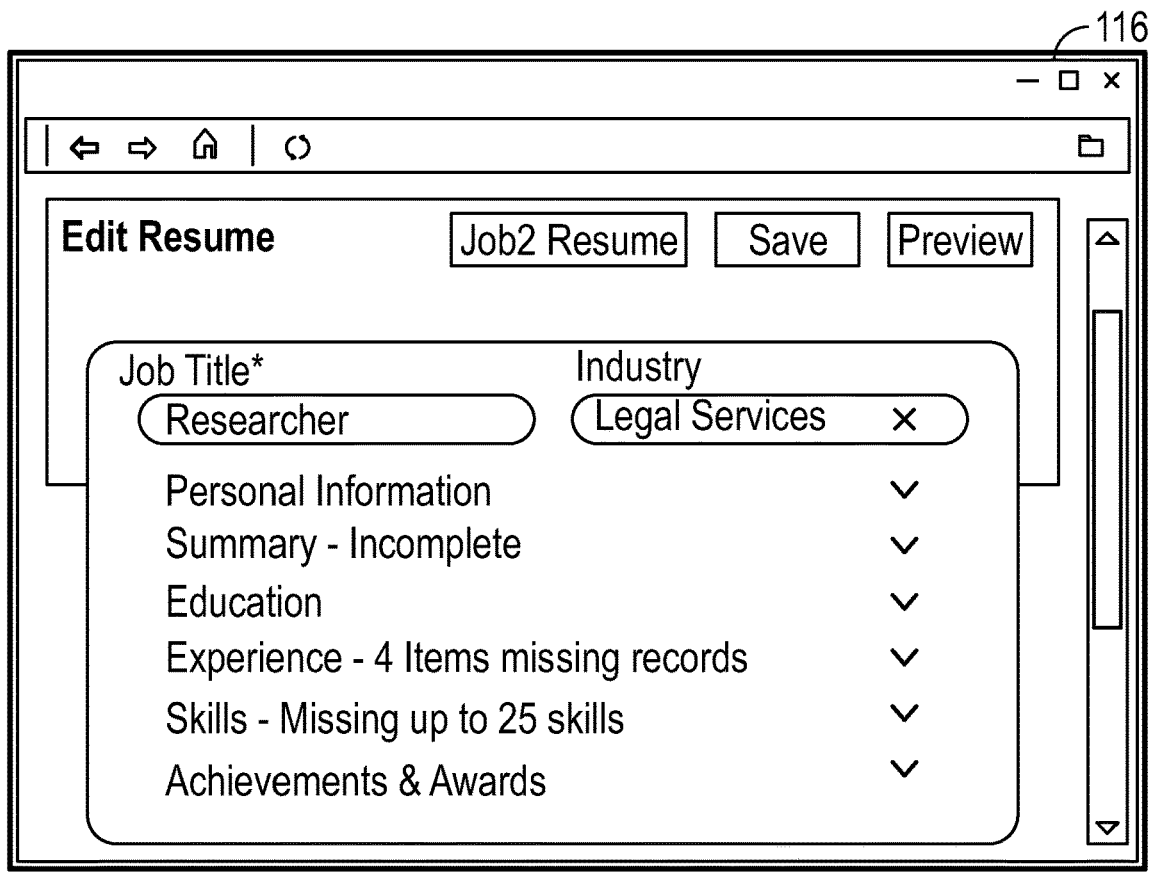
FIGS. 8-12 provide examples of how the user may be encouraged, via a user interface, to update the resume, in accordance with various embodiments.
Figure 9:
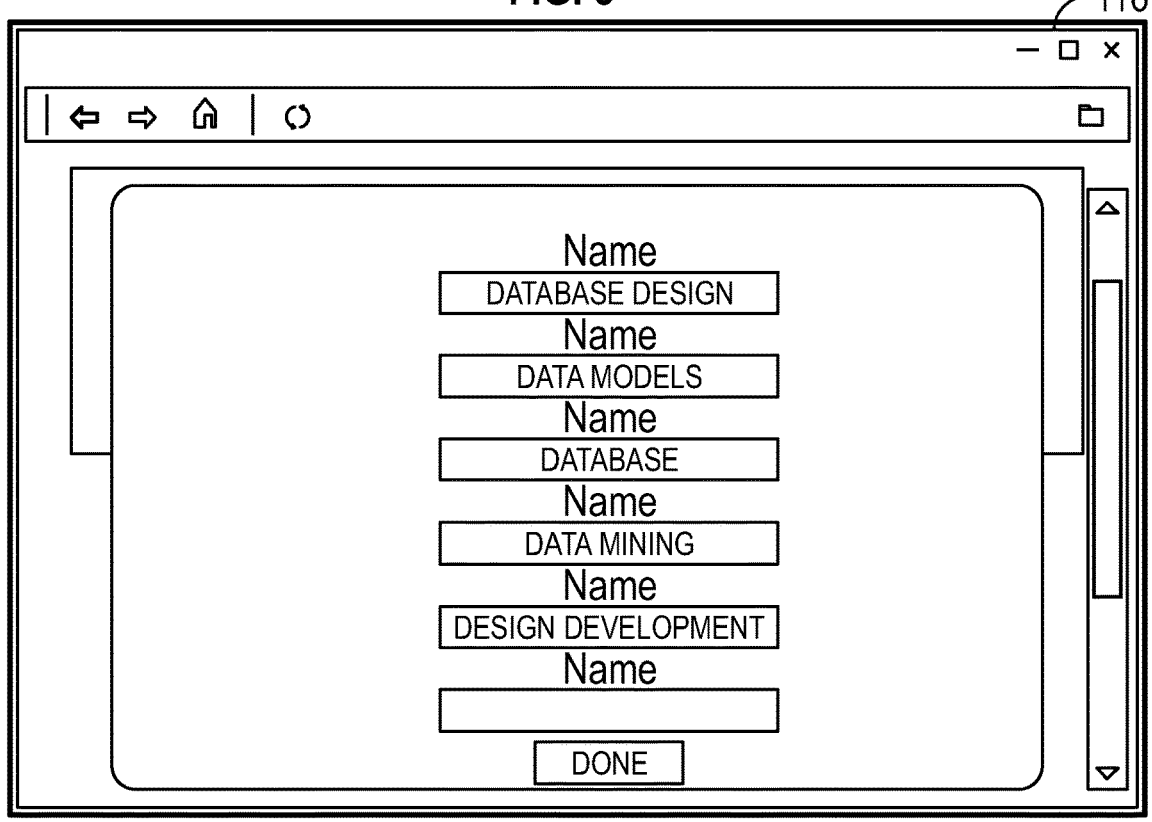
Figure 10:
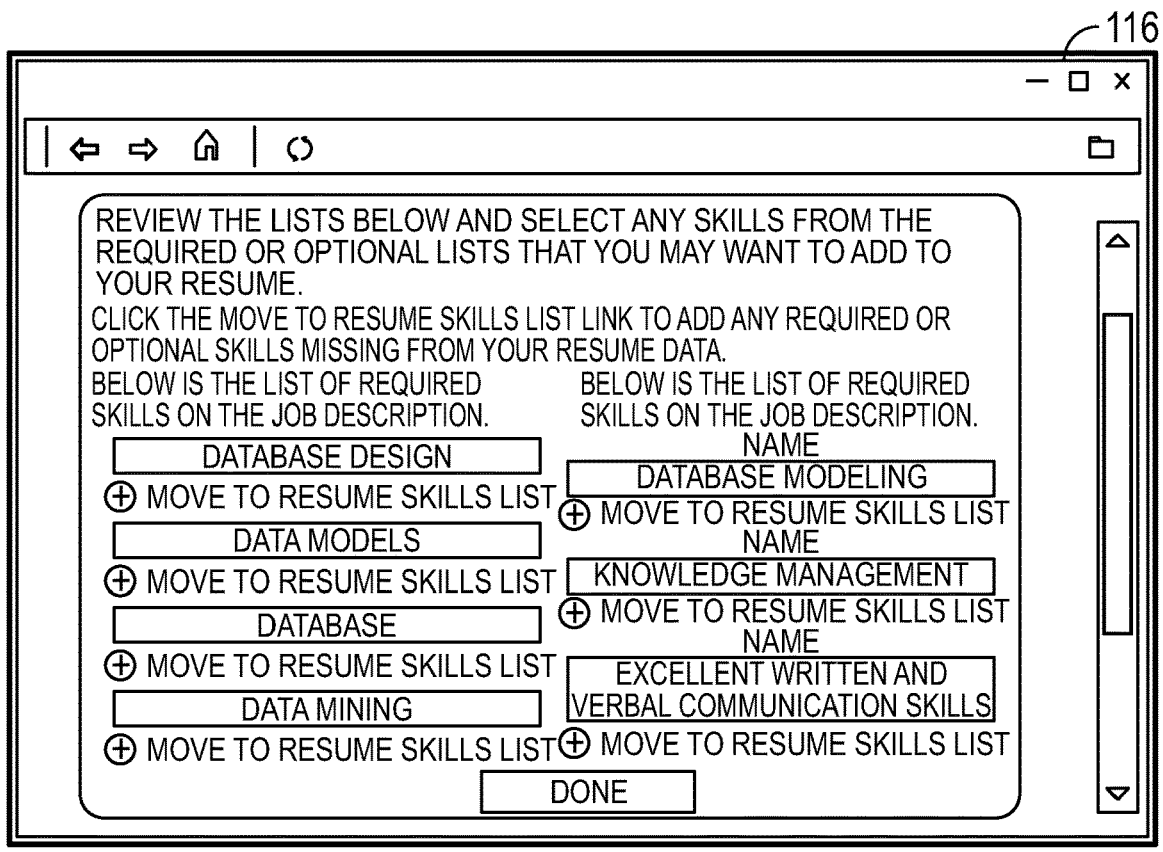
Figure 11:
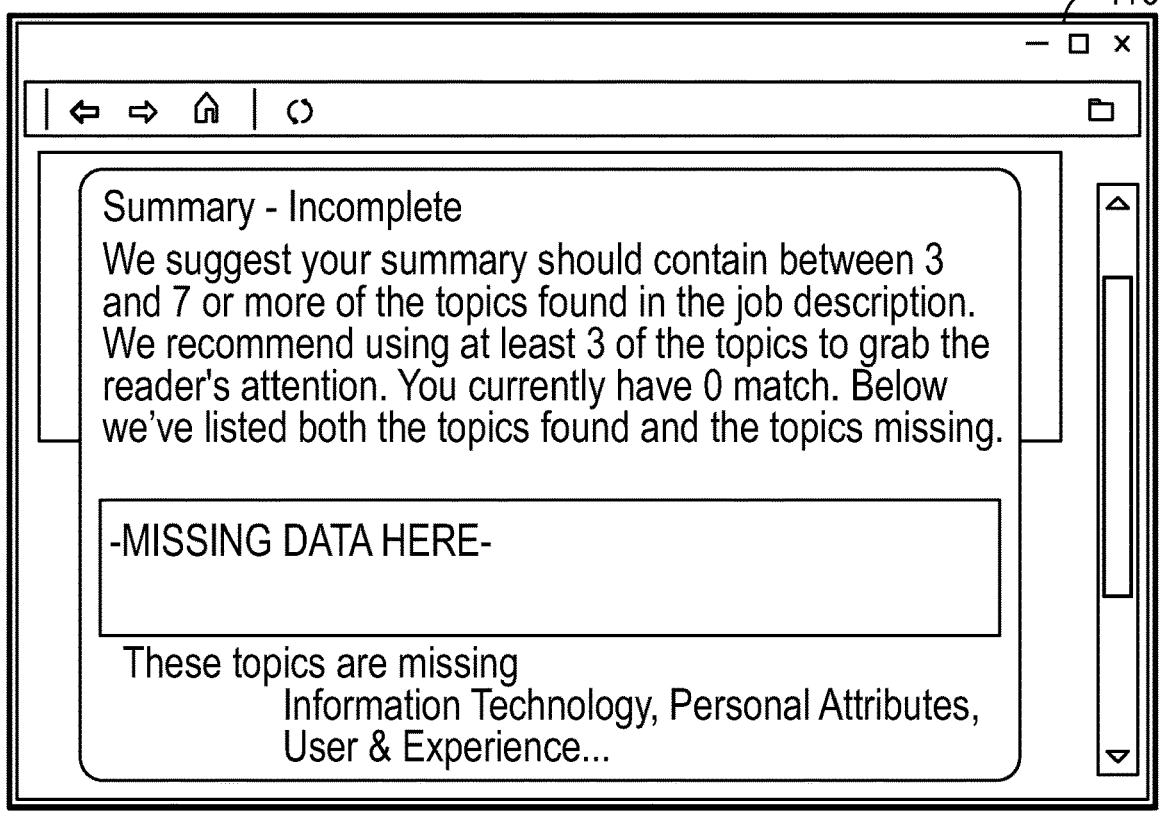
Figure 12:
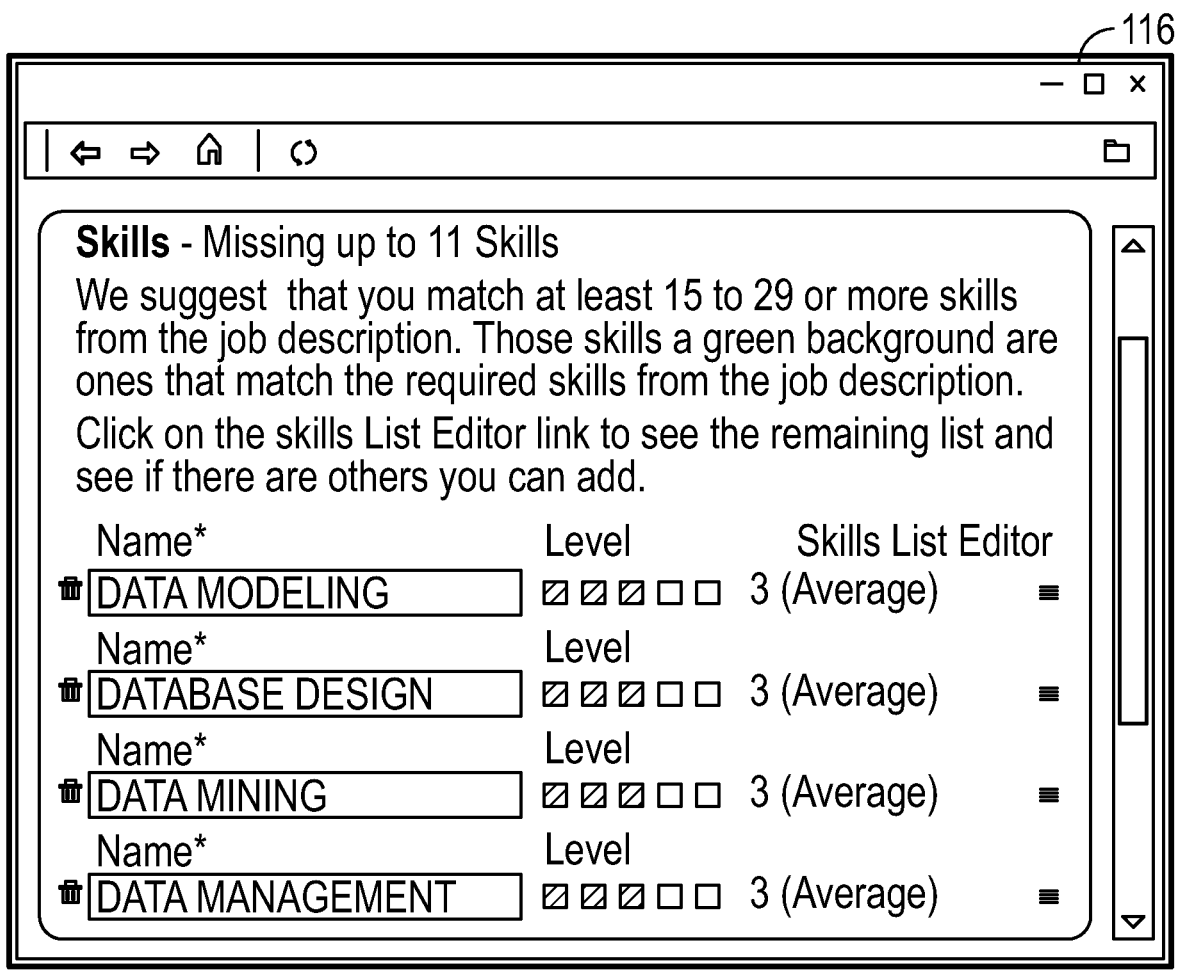

Furthermore, based on the analysis of cognitive AI engine 204, resume generator engine 206 may prompt the user to update the resume, via user interface 116, to optimize the resume for the job description. For example, in FIG. 8, the user is informed of the sections of the resume that should be updated. In FIG. 8, "Summary" is indicated as incomplete, "Experience" is indicated as missing keywords, and "Skills" is indicated as missing skills. The keywords that are identified as missing may have been included the job description or listing and not included in the resume that was uploaded.

FIGS. 9-12 provide examples of how the user may be encouraged, via user interface 116, to update the resume based on the analysis of cognitive AI engine 204. For example, in FIG. 9, the user is provided with a list of skills found in the job description and suggested to add one or more of the skills to the experience section of the resume. As another example, in FIG. 10, the user is provided a list of optional skills and required skills that were not included in the resume that cognitive AI engine 204 determined are beneficial to the user to include in the resume. For ease in updating the resume, the user may click the "Move to Resume Skills List" to add to the skill to the resume. That is, the user may use one-click of an input peripheral to cause the resume to be updated with the recommended information (e.g., skill), without having to actually open the resume in a separate application, type in the recommended information, and close out the resume. Such reduced input from the input peripheral may save computing resources (e.g., processing, memory, network, etc.) by using the one-click feature, and therefore may also improve the user's experience generating a resume and using a computing device. Further, in FIG. 11, the user is prompted to update the summary of the resume. The user is recommended to include in the summary topics mentioned in the job description but missing from the resume. Finally, in FIG. 12, the user is recommended to include particular skills related to the job description and indicate a strength level associated with each skill.

One example technical benefit of many technical benefits of the Job2Resume™ embodiment described above is that a user may use one-click of an input peripheral to cause the resume to be updated with the recommended information (e.g., skill) without having to open the resume in a separate application, type in the recommended information, and close out the resume. Such reduced input from the input peripheral may save computing resources (e.g., processing, memory, network, etc.) by using the one-click feature, and therefore may also improve the user's experience generating a resume and using a computing device.

Figure 13A:

FIGS. 13A and 13B shows an exemplary embodiment of a resume generated by resume generator engine 206. In some embodiments, resume generator engine 206 may generate a "hybrid resume". A hybrid resume, as referred to herein, is a document comprising two or more layers, where at least one layer is a visually designed resume including one or more graphics and format displays (this visually designed resume may be referred to as a "visible" layer) and at least one layer is a cleanly, parsable resume including unformatted plain text this cleanly, parsable resume including unformatted plain text may be referred to as a "hidden" layer). FIG. 13A provides an exemplary embodiment of a "visual resume" and FIG. 13B provides an exemplary embodiment of "parsable resume". In some embodiments, the visual resume layer, shown in FIG. 13A, is layered on top of the parsable resume layer, shown in FIG. 13B, to form the hybrid resume. The content of the parsable resume is hidden behind the visual resume, allowing for the content of the parsable resume to be invisible to a human reader. In contrast, the content of the parsable resume is accessible to an applicant tracking systems (ATS).

The hybrid resume provides a means for a candidate to produce a document that is consumable by both a human and an ATS. Furthermore, as in the process described above, the hybrid resume may be generated utilizing AI technologies employed by cognitive AI engine 204 in FIG. 2 to provide guidance in the document creation process such that the hybrid resume ensures that the candidate is referencing skills and experience that is most relevant to the position being is applied for.

In some embodiments, a hybrid document is intelligently generated from a dataset that can be consumed by a human or a machine. Moreover, although a document can be generated using any dataset, hybrid resume may use a predefined user profile to select a subset of data that best fits the known criteria for the job the candidate is apply for. The dataset may contain at least enough information to identify the candidate and the skills and experience the candidate possesses. The dataset may also include at least the first and last name of the candidate, phone number, email address, education and employment histories, hard and soft skills, and objective statement.

In some embodiments, the generation of the hybrid resume may take into consideration the technical function of an ATS while creating the document. For example, although any source can be used for defining job criteria, the embodiments described herein use a job order to identify requisite skills that should be included in the document. Requisite skills are identified by cognitive AI engine 204 and, using an ontology library, are matched to identified skills in the candidate. The skills are then transpiled to match the keyword(s) the ATS is expecting to find in the document.

Although any number of file formats can be used, the embodiments described herein may use a rasterized image format of the resume created in the software user experience to be consumed by a human, layered on top of a live text format of the same resume being produced to be consumed by the ATS. In some embodiments, a block templating language may be user that replaces placeholders with information from the dataset. This abstraction of content from visual layout design allows the document design definition to be exchanged for another while sharing a dataset or subset thereof. Once the hybrid document is created, the underlying live text is easily parsable by the ATS for accurate and complete machine readability, while still being visually appealing for any human or process thereof that might evaluate the document.

One example technical benefit of many technical benefits afforded by the hybrid resume includes using a hidden layer of text to easily and efficiently change the appearance of a visible layer. Through changes to the text in the hidden layer, the format of the visible layer may be transformed. This provides a technical solution of dynamically generated hybrid resumes that are customizable in real-time. Further, the text in the hidden layer is machine-readable and efficiently processed by the ATS system.

The conventional way of reviewing candidates prior to an interview is through recruiters reviewing resumes. Unconscious human bias leads to women, minorities, and older candidates being discriminated against during this process. Enterprise/candidate employment assistance platform 104 eliminates unconscious human bias and is capable of processing more candidates so that a candidate pool is not reduced to a less diverse candidate pool for the sake of making resume review loads more manageable (such as filtering by top colleges or relying on employee-referral programs). Further, in some embodiments, enterprise/candidate employment assistance platform 104 is configured to continuously audit itself for bias by verifying that the set of recommended candidates is a representative sample of the entire set of qualified candidates.

Moreover, traditional hiring tools may also be biased. For example, ATS systems employ mechanisms in their parsing/filtering systems for biasing based on race, age, and gender. Enterprise/candidate employment assistance platform 104 is configured to remove items that could be used to determine race, age, and gender from the hidden layer that is readable by the ATS. For example, resume generator engine 206 may generate a hybrid resume in which the hidden layer does not include the year a candidate graduated from college or organizations the candidate is a member of that may reveal gender.

Figure 14:
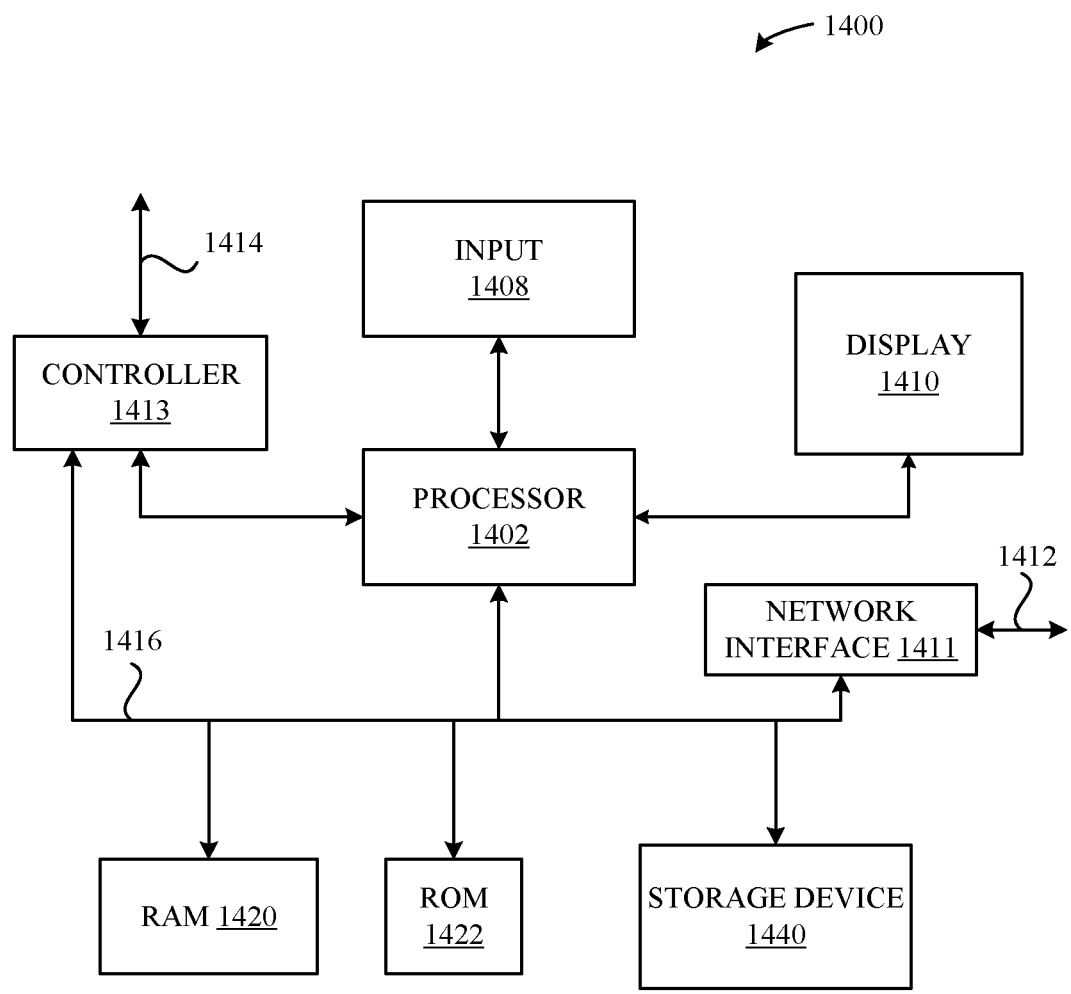
FIG. 14 illustrates a detailed view of a computing device that can represent the computing devices of FIG. 1 used to implement the various platforms and techniques described herein, according to some embodiments.

FIG. 14 illustrates a detailed view of a computing device 1400 that can be used to implement the various components described herein, according to some embodiments. In particular, the detailed view illustrates various components that can be included in client computing devices 110 and 112 illustrated in FIG. 1, as well as the several computing devices implementing enterprise/candidate employment assistance platform 104 illustrated in FIGS. 1 and 2. As shown in FIG. 14, computing device 1400 can include a processor 1402 that represents a microprocessor or controller for controlling the overall operation of computing device 1400. Computing device 1400 can also include a user input device 1408 that allows a user of computing device 1400 to interact with computing device 1400. For example, the user input device 1408 can take a variety of forms, such as a button, keypad, dial, touch screen, audio input interface, visual/image capture input interface, input in the form of sensor data, and so on. Still further, computing device 1400 can include a display 1410 that can be controlled by the processor 1402 to display information to the user. A data bus 1416 can facilitate data transfer between at least a storage device 1440, processor 1402, and a controller 1413. Controller 1413 can be used to interface with and control different equipment through an equipment control bus 1414. Computing device 1400 can also include a network/bus interface 1411 that couples to a data link 1412. In the case of a wireless connection, network/bus interface 1411 can include a wireless transceiver.

As noted above, computing device 1400 also includes storage device 1440, which can comprise a single disk or a collection of disks (e.g., hard drives), and includes a storage management module that manages one or more partitions within storage device 1440. In some embodiments, storage device 1440 can include flash memory, semiconductor (solid-state) memory or the like. Computing device 1400 can also include a Random-Access Memory (RAM) 1420 and a Read-Only Memory (ROM) 1422. ROM 1422 can store programs, utilities or processes to be executed in a non-volatile manner. RAM 1420 can provide volatile data storage, and stores instructions related to the operation of processes and applications executing on the computing device.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

Consistent with the above disclosure, the examples of systems and method enumerated in the following clauses are specifically contemplated and are intended as a non-limiting set of examples.

Clause 1. A method, comprising: training, based on personal attributes of employees of multiple employers and work culture attributes associated with each employer of the multiple employers, an employee-employer compatibility model that defines associations between the personal attributes and the work culture attributes; extracting information associated with a person from one or more sources on the Web where the person is represented; generating, based on the information associated with the person, a user profile associating personal attributes with the person; applying the user profile to the employee-employer compatibility model; receiving an indication, from the employee-employer compatibility model, of an employer profile that is compatible with the user profile, the employer profile including work culture attributes associated with an employer; and generating a notification that indicates at least one of a designation of the employer or the work culture attributes associated with the employer.

Clause 2. The method of any foregoing clause, further comprising: extracting information associated with the employer from the one or more sources on the Web where the employer is represented; and generating, based at least in part, on the information associated with the employer, the employer profile.

Clause 3. The method of any foregoing clause, further comprising updating the employee-employer compatibility model to account for one or more associations detected between the user profile and the employer profile.

Clause 4. The method of any foregoing clause, further comprising: extracting additional information associated with the person from at least one of a resume of the person or from a questionnaire completed by the person; and generating the user profile based on the additional information associated with the person.

Clause 5. The method of any foregoing clause, further comprising: auditing the employee-employer compatibility model for bias by verifying that a group of recommended candidates is a representative sample of a group of all qualified candidates.

Clause 6. The method of any foregoing clause, further comprising: receiving an indication from the employee-employer compatibility model that the user profile is compatible with a plurality of employer profiles, each employer profile of the plurality of employer profiles including work culture attributes corresponding to an employer.

Clause 7. The method of any foregoing clause, further comprising: identifying job listings of the employers associated with the identified employer profiles; and generating a notification for the person including indications of the job listings.

Clause 8. A system, comprising: a model generator configured to train, based on personal attributes of employees of multiple employers and work culture attributes associated with each employer of the multiple employers, an employee-employer compatibility model that defines associations between the personal attributes and the work culture attributes; an agent of the system configured to extract information associated with an employer from one or more sources on the Web where the employer is represented; and cognitive artificial intelligence engine configured to: generate, based on the information associated with the employer, an employer profile including work culture attributes of the employer; apply the employer profile to the employee-employer compatibility model; and receive an indication, from the employee-employer compatibility model, of a user profile that is compatible with the employer profile, the user profile associating personal attributes with a person.

Clause 9. The system of any foregoing clause, wherein the profile generator is further configured to: extract information associated with the person from the one or more sources on the Web where the person is represented; and generate, based on the information associated with the person, the user profile.

Clause 10. The system of any foregoing clause, wherein the model generator is further configured to update the employee-employer compatibility model to account for one or more associations detected between the user profile and the employer profile.

Clause 11. The system of any foregoing clause, wherein the cognitive AI engine is further configured to: receive an indication from the employee-employer compatibility model that the employer profile is compatible with a plurality of user profiles, each user profile of the plurality of user profiles associating personal attributes with a corresponding person.

Clause 12. The system of any foregoing clause, wherein the agent is further configured to generate a notification that indicates at least one of information identifying the person or the personal attributes.

Clause 13. The system of any foregoing clause, wherein the cognitive AI engine is further configured to: extract additional information associated with the employer from one or more job listings published by the employer; and generate the employer profile based on the additional information associated with the employer.

Clause 14. A computer-readable storage medium having program instructions recorded thereon that, when executed by at least one processing circuit of a computing device, perform a method, comprising: training, based on personal attributes of employees of multiple employers and work culture attributes associated with each employer of the multiple employers, an employee-employer compatibility model that defines associations between the personal attributes and the work culture attributes; extracting information associated with a person from one or more sources on the Web where the person is represented; generating, based on the information associated with the person, a user profile associating personal attributes with the person; applying the user profile to the employee-employer compatibility model; receiving an indication, from the employee-employer compatibility model, of an employer profile that is compatible with the user profile, the employer profile including work culture attributes associated with an employer; and generating a notification that indicates at least one of a designation of the employer or the work culture attributes associated with the employer.

Clause 15. The computer-readable storage medium of any foregoing clause, wherein the method further comprises: extracting information associated with the employer from the one or more sources on the Web where the employer is represented; and generating, based at least in part, on the information associated with the employer, the employer profile.

Clause 16. The computer-readable storage medium of claim any foregoing clause, wherein the method further comprises: updating the employee-employer compatibility model to account for one or more associations detected between the user profile and the employer profile.

Clause 17. The computer-readable storage medium of any foregoing clause, wherein the method further comprises: extracting additional information associated with the person from at least one of a resume of the person or from a questionnaire completed by the person; and generating the user profile based on the additional information associated with the person.

Clause 18. The computer-readable storage medium of any foregoing clause, wherein the method further comprises: training the employee-employer compatibility model based on professional attributes of the person.

Clause 19. The computer-readable storage medium of any foregoing clause, wherein the method further comprises: receiving an indication from the employee-employer compatibility model that the user profile is compatible with a plurality of employer profiles, each employer profile of the plurality of employer profiles including work culture attributes corresponding to an employer.

Clause 20. The computer-readable storage medium of any foregoing clause, wherein the method further comprises: identifying job listings of the employers associated with the identified employer profiles; and generating a notification for the person including indications of the job listings.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system for generating a hybrid resume for a candidate, the system comprising:
   a computer-based interface capable of receiving a plurality of attributes from a plurality of candidates, wherein each attribute in the plurality of attributes is electronically stored;
   a computer system with one or more processors having circuitry to execute instructions;
   a memory unit available to the one or more processors, wherein:
   the memory unit is communicatively coupled to the processor,
   the memory unit is capable of storing the plurality of attributes created by the computer-based interface, and
   the memory unit is capable of having sequences of instructions stored therein, which when executed cause the one or more processors to:
   aggregate and store a plurality of data, wherein the plurality of data comprises each attribute associated with a particular candidate for each particular candidate in the plurality of candidates,
   transform the plurality of data into a knowledge graph,
   use the knowledge graph to identify variables that are desired by a particular job listing,
   select, based on the variables that are desired by the particular job listing, at least one or more attributes associated with the particular candidate, wherein the one or more attributes associated with the particular candidate comprise selected attributes,
   input the selected attributes into a visual layer of electronic media, wherein the visual layer comprises graphics and the visual layer comprises format displays, input attributes that are a subset of the selected attributes into a hidden layer of electronic media, wherein the hidden layer comprises computer-readable content and the hidden layer is capable of being accessed by an applicant tracking system, and compile the hidden layer and the visual layer into a single electronic document, wherein the single electronic document comprises a hybrid resume;

a communication device capable of transmitting the hybrid resume to a remote computer.

2. The system of claim 1, wherein the single electronic document comprises computer-readable text that comprises plain text, unformatted text, or combinations thereof.

3. The system of claim 1, wherein the visual layer is displayed on a computing device to a user.

4. The system of claim 3, wherein the hidden layer is accessible to the computing device and not displayed on the computing device to the user.

5. A method of generating a hybrid resume comprising a hidden layer and a visual layer, the method comprising:

receiving, from a computing device of a particular user of a plurality of users, a selection of a job listing, wherein each of the plurality of users has a predefined user profile that is compiled into a dataset of a plurality of datasets;

responsive to receiving the selection of the job listing, identifying a particular dataset in the plurality of datasets, wherein the particular dataset corresponds to the predefined user profile of the particular user, and the particular dataset comprises one or more attributes of the particular user;

selecting, based on an attribute of the job listing, at least one of the one or more attributes of the particular user;

inputting a subset of the at least one of the one or more attributes of the predefined user profile from the particular dataset into the hidden layer of the hybrid resume, wherein the hidden layer comprises computer-readable content, and the computer-readable content is capable of being processed by an applicant tracking system;

configuring the particular dataset into a visible dataset, wherein the visible dataset comprises one or more data, the one or more data comprise a graphical representation of the at least one of the one or more attributes of the particular dataset, and the one or more data comprise a formatted text of the at least one of the one or more attributes of the particular dataset;

inputting the visible dataset into the visual layer;

generating a document with two or more layers, wherein at least one of the two or more layers comprises the visual layer, and at least one of the two or more layers comprises the hidden layer.

6. The method of claim 5, wherein the one or more attributes are selected from a group consisting of first and last name of the particular user, phone number, email address, education history, employment histories, hard skills, soft skills, objective statements, and combinations thereof.

7. The method of claim 5, wherein the generation of the hybrid resume occurs on a computing device, wherein:

the computing device comprises a cognitive artificial intelligence (AI) engine, the cognitive AI engine tracks information from a plurality of job listings, and the information from the plurality of job listings comprises a plurality of desired attributes pertaining to a candidate employee.

8. The method of claim 7 further comprising:

prior to inputting the visible dataset into the hidden layer, indexing the plurality of desired attributes into a plurality of categories, wherein the indexing is performed by the cognitive AI engine, the plurality of categories are included in an ontology library, and each category in the plurality of categories comprises one or more desired attributes in the plurality of desired attributes.

9. The method of claim 8 further comprising:

responsive to identifying the particular dataset, indexing attributes of the particular dataset into the plurality of categories.

10. The method of claim 9 further comprising:

responsive to indexing the attributes, determining if the attributes of the particular user are within a particular category of the plurality of categories, wherein the particular category is one or more of the categories in the plurality of categories that contains a particular set of desired attributes, the particular set of desired attributes corresponds to the information from the job listing, and the information is harvested by the cognitive AI engine.

11. The method of claim 10 further comprising:

responsive to determining the set of desired attributes for the job listing, identifying one or more attributes of the particular user that are categorized within the same one or more categories as the particular set of desired attributes.

12. The method of claim 11 further comprising:

responsive to identifying the one or more attributes of the particular user that are categorized within the same one or more categories as the particular set of desired attributes, classifying the identified attributes of the particular user as matching attributes.

13. The method of claim 12 further comprising:

responsive to classifying the matching attributes and prior to inputting the particular dataset into the hidden layer, transpiling the matching attributes into the desirable attributes, wherein the particular dataset comprises the desirable attributes.

14. The method of claim 5, wherein the visible dataset comprises a rasterized image format, wherein the rasterized image format is created on the computing device, and the rasterized image format is capable of being viewed by a user in the plurality of users.

15. The method of claim 5, wherein the computer readable content of the hidden layer comprises a live text format.

16. The method of claim 5, wherein the graphical representations in the visual layer comprise one or more placeholders.

17. The method of claim 16, further comprising a block templating language, wherein the block templating language replaces the one or more placeholders with the information from the particular dataset.

18. The method of claim 5, wherein the hidden layer is hidden behind the visual layer.

19. A tangible, non-transitory computer-readable medium storing instructions that, when executed, cause a processor to:

aggregate and store a plurality of data, wherein the plurality of data comprises each attribute associated with a particular candidate for each particular candidate in a plurality of candidates;

transform the plurality of data into a knowledge graph;

use the knowledge graph to identify variables that are desired by a particular job listing;

select, based on the variables that are desired by the particular job listing, at least one or more attributes associated with the particular candidate, wherein the one or more attributes associated with the particular candidate comprise selected attributes;

input the selected attributes into a visual layer of electronic media, wherein the visual layer comprises graphics and the visual layer comprises format displays;

input attributes that are a subset of the selected attributes into a hidden layer of electronic media, wherein the hidden layer comprises computer-readable content and the hidden layer is capable of being accessed by an applicant tracking system; and compile the hidden layer and the visual layer into a single electronic document, wherein the single electronic document comprises a hybrid resume that is transmitted to a remote computer.

20. The computer-readable medium of claim 19, wherein the single electronic document comprises computer-readable text that comprises plain text, unformatted text, or combinations thereof.

* * * * *